(12) United States Patent
King et al.

(10) Patent No.: US 6,921,221 B2
(45) Date of Patent: Jul. 26, 2005

(54) COMBINATION KEYBOARD AND PRINTER APPARATUS

(75) Inventors: Tobin Allen King, Balmain (AU); Kia Silverbrook, Balmain (AU)

(73) Assignee: Silverbrook Research PTY LTD, Balmain (AU)

( * ) Notice: Subject to any disclaimer, the term of this patent is extended or adjusted under 35 U.S.C. 154(b) by 0 days.

(21) Appl. No.: 10/974,731

(22) Filed: Oct. 28, 2004

(65) Prior Publication Data

US 2005/0063758 A1 Mar. 24, 2005

Related U.S. Application Data

(63) Continuation of application No. 10/309,026, filed on Dec. 4, 2002, now Pat. No. 6,830,395, which is a continuation of application No. 09/966,293, filed on Sep. 28, 2001, now Pat. No. 6,641,315, which is a continuation-in-part of application No. 09/112,767, filed on Jul. 10, 1998, now Pat. No. 6,416,167.

(30) Foreign Application Priority Data

Jul. 15, 1997 (AU) ............................................. PO7991
Mar. 25, 1998 (AU) ............................................. PO2592

(51) Int. Cl.[7] ................................................. B41J 5/08
(52) U.S. Cl. ........................ 400/472; 400/88; 400/489
(58) Field of Search ........................ 400/472, 88, 489

(56) References Cited

U.S. PATENT DOCUMENTS

| | | | |
|---|---|---|---|
| 4,423,401 A | 12/1983 | Mueller | |
| 4,553,393 A | 11/1985 | Ruoff | |
| 4,623,965 A | 11/1986 | Wing | |
| 4,672,398 A | 6/1987 | Kuwabara et al. | |
| 4,737,802 A | 4/1988 | Mielke | |
| 4,864,824 A | 9/1989 | Gabriel et al. | |
| 5,029,805 A | 7/1991 | Albarda et al. | |
| 5,115,374 A | 5/1992 | Hongoh | |
| 5,188,464 A | 2/1993 | Aaron | |
| 5,189,473 A * | 2/1993 | Negoro et al. | 399/93 |
| 5,258,774 A | 11/1993 | Rogers | |
| 5,443,320 A | 8/1995 | Agata et al. | |
| 5,659,345 A | 8/1997 | Altendorf | |
| 5,845,144 A * | 12/1998 | Tateyama et al. | 712/1 |
| 6,155,669 A | 12/2000 | Donahue et al. | |
| 6,158,906 A | 12/2000 | Simon et al. | |
| 6,312,099 B1 * | 11/2001 | Hawkins et al. | 347/42 |
| 6,474,882 B1 | 11/2002 | Vaghi | |
| 6,555,201 B1 | 4/2003 | Dhuler et al. | |

FOREIGN PATENT DOCUMENTS

| | | |
|---|---|---|
| DE | 1 648 322 | 3/1971 |
| DE | 29 05 063 | 8/1980 |
| DE | 32 45 283 | 8/1984 |
| DE | 34 30 155 | 2/1986 |
| DE | 37 16 996 | 12/1988 |
| DE | 39 34 280 | 4/1990 |
| DE | 43 28 433 | 3/1995 |

(Continued)

OTHER PUBLICATIONS

Computer translation of JP 11–212703.*

IBM Technical Disclosure Bulletin, vol. 34, Issue 10B, pp. 178–180, Mar. 1992.*

(Continued)

Primary Examiner—Charles H. Nolan, Jr.

(57) ABSTRACT

A combination keyboard and printer apparatus includes a housing having a print media entry slot and a print media ejection slot. A printer assembly is located within a chamber defined by the housing on a print media transport path between the entry slot and the ejection slot. A print media exit tray extends outwardly from the ejection slot and is formed as a unitary piece with the housing.

7 Claims, 3 Drawing Sheets

FOREIGN PATENT DOCUMENTS

| | | |
|---|---|---|
| DE | 195 16 997 | 11/1995 |
| DE | 195 17 969 | 11/1995 |
| DE | 195 32 913 | 3/1996 |
| DE | 196 39 717 | 4/1997 |
| DE | 196 23 620 | 12/1998 |
| EP | 0 092 229 | 10/1983 |
| EP | 0 398 031 | 11/1990 |
| EP | 0 427 291 | 5/1991 |
| EP | 0 431 338 | 6/1991 |
| EP | 0 478 956 | 4/1992 |
| EP | 0 506 232 | 9/1992 |
| EP | 0 510 648 | 10/1992 |
| EP | 0 627 314 | 12/1994 |
| EP | 0706893 B1 | 4/1996 |
| EP | 0 713 774 | 5/1996 |
| EP | 0 737 580 | 10/1996 |
| EP | 0 750 993 | 1/1997 |
| EP | 0 882 590 | 12/1998 |
| FR | 2 231 076 | 12/1974 |
| GB | 792 145 | 3/1958 |
| GB | 1 428 239 | 3/1976 |
| GB | 2 262 152 | 6/1993 |
| JP | 58 112747 | 7/1983 |
| JP | 58 116165 | 7/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 306254 | 12/1989 |
| JP | 02 050841 | 2/1990 |
| JP | 2-92643 | 4/1990 |
| JP | 2-108544 | 4/1990 |
| JP | 02 158348 | 6/1990 |
| JP | 02 162049 | 6/1990 |
| JP | 03 653348 | 3/1991 |
| JP | 03 112662 | 5/1991 |
| JP | 03 180350 | 8/1991 |
| JP | 04 118241 | 4/1992 |
| JP | 04 126255 | 4/1992 |
| JP | 04 141429 | 5/1992 |
| JP | 4-353458 | 12/1992 |
| JP | 04 368851 | 12/1992 |
| JP | 05108278 | 4/1993 |
| JP | 05 28765 | 10/1993 |
| JP | 05 318724 | 12/1993 |
| JP | 6-91865 | 4/1994 |
| JP | 6-91866 | 4/1994 |
| JP | 2-265752 | 1/1995 |
| JP | 07 314665 | 12/1995 |
| JP | 11212703 A * 8/1999 ............ G06F/3/02 |
| WO | WO 94 18010 | 8/1994 |
| WO | WO 95 10810 | 4/1995 |
| WO | WO 97 12689 | 4/1997 |

OTHER PUBLICATIONS

Noworolski, J. Mark et al, "Process for in–plane and out-–of–plane single–crystal–silicon thermal microactuators". Sensors and Actuators, A, CH, Elsevier Sequoia S.A., Lausanne, vol. 55, No. 1, Jul. 15, 1996, pp 65–69, XP004077979 ISSN: 0924–4247.

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp 146–150, XP000443412, ISSN: 1057–7157.

Yamagata, Yutaka et al, "A Micro Mobile Mechanism Using Thermal Expanison and its Theoretical Analysis". Proceedeing of the workshop on micro electro mechanical systems (MEMS). US, New York, IEEE, vol. workshop 7, Jan. 25, 1994, pp 142–147, XP000528408, ISBN: 0–7803–1834–X.

"ABLEDATA Database of Assistive Technology", Feb. 1999 p2–3 shows Postron Express keyboard/printer.

"Enhanced Communications" website showing Postron Express keyboard/printer. Copyright 1997–2000 http://web.archive.org/web/20020819212351re__/http://www.enhancedcom:net/positron express:asp.

"TDD Products for PSAPS" (Larson) Mar./Apr. 1997 from 9–11 Magazine Note: Establishes that "Positron Express" keyboard integrated with printer was known in 1997.

* cited by examiner

US 6,921,221 B2

COMBINATION KEYBOARD AND PRINTER APPARATUS

CROSS REFERENCE TO RELATED APPLICATION

The present application is a continuation of U.S. application Ser. No. 10/309,026 filed on Dec. 4, 2002 now U.S. Pat. No. 6,830,395, which is a continuation of U.S. Application Ser. No. 09/966,293 filed on Sep. 28, 2001, now issued as U.S. Pat. No. 6,641,315, which is a continuation in part of U.S. application No. 09/112,767 filed on Jul. 10, 1998, now issued as U.S. Pat. No. 6,416,167, the entire contents of which are herein incorporated by reference.

FIELD OF INVENTION

This invention relates to a user interface with integrated printing. More particularly, the invention relates to a combination keyboard and printer apparatus.

BACKGROUND TO THE INVENTION

Printers for use with computers can be relatively expensive devices. Accordingly, in a work environment, it is common for a plurality of work stations to be serviced by a single printer station with the computers of those work stations communicating with the printer.

This necessitates people at the work station having to get up and collect their documents from the printer which can be time wasting. Often, all that is required is a single sheet of paper, for example, where a letter is to be generated or where an image is to be viewed and a hard copy of the image is required.

Desktop inkjet printers are available at low cost, but typically take up substantial desk space. Incorporation of the printing function in a desktop computer keyboard frees up this desk space.

While it is technically possible to incorporate a scanning ink jet printer into a keyboard, this has several disadvantages, including excess bulk, and side-to-side vibration as the printhead scans.

Recently, the present inventor has invented ink jet printer technologies suitable for incorporation in a desktop keyboard, such as:

| | | | | |
|---|---|---|---|---|
| 6,227,652 | 6,213,588 | 6,213,589 | 6,231,163 | 6,247,795 |
| 09/113,099 | 6,244,691 | 6,257,704 | 09/112,778 | 6,220,694 |
| 6,257,705 | 6,247,794 | 6,234,610 | 6,247,793 | 6,264,306 |
| 6,241,342 | 6,247,792 | 6,264,307 | 6,254,220 | 6,234,611 |
| 09/112,808 | 09/112,809 | 6,239,821 | 09/113,083 | 6,247,796 |
| 09/113,122 | 09/112,793 | 09/112,794 | 09/113,128 | 09/113,127 |
| 6,227,653 | 6,234,609 | 6,238,040 | 6,188,415 | 6,227,654 |
| 6,209,989 | 6,247,791 | 09/112,764 | 6,217,153 | 09/112,767 |
| 6,243,113 | 09/112,807 | 6,247,790 | 6,260,953 | 6,267,469 |
| 09/425,419 | 09/425,418 | 09/425,194 | 09/425,193 | 09/422,892 |
| 09/422,806 | 09/425,420 | 09/422,893 | 09/693,703 | 09/693,706 |
| 09/693,313 | 09/693,279 | 09/693,727 | 09/693,708 | 09/575,141 |

These ink jet technologies are suitable for the construction of miniature, low cost pagewidth printers, which can readily fit within a keyboard form factor.

SUMMARY OF THE INVENTION

According to a first aspect of the present invention there is provided a combination keyboard and printer apparatus, including;

a housing having an upper surface formed with an opening for a number of keyboard keys;

a printer assembly located on a print media transport path within a chamber defined by the housing;

a print media entry slot continuous with said transport path formed through a first side of the housing;

a print media ejection slot continuous with said transport path formed through a second side of the housing opposite the first side; and a print media exit tray extending outwardly from the ejection slot formed as a unitary piece with the housing.

Preferably the keyboard keys are arranged to engage key switches of a keyboard circuit board located within the housing.

The keyboard circuit board may be coupled to a serial bus to communicate with a computer.

In a preferred embodiment the printer assembly includes a printer controller circuit that is coupled to the serial bus to communicate with the computer.

A belt-and-roller transport assembly may be disposed to transport print media along the transport path.

Preferably a planar member is biased against the belt-and-roller transport assembly to maintain planarity of print media in use.

It is desirable that the planar member and the belt-and-roller transport assembly are located beneath the keyboard circuit board.

Preferably the printer assembly comprises a pagewidth ink jet printhead.

The printer assembly may include a plurality of galleries each in fluid communication with the printhead and dedicated to store a different color ink.

BRIEF DESCRIPTION OF THE DRAWINGS

The invention is now described by way of example with reference to the accompanying diagrammatic drawings in which.

DETAILED DESCRIPTION OF THE DRAWINGS

Figure 2:
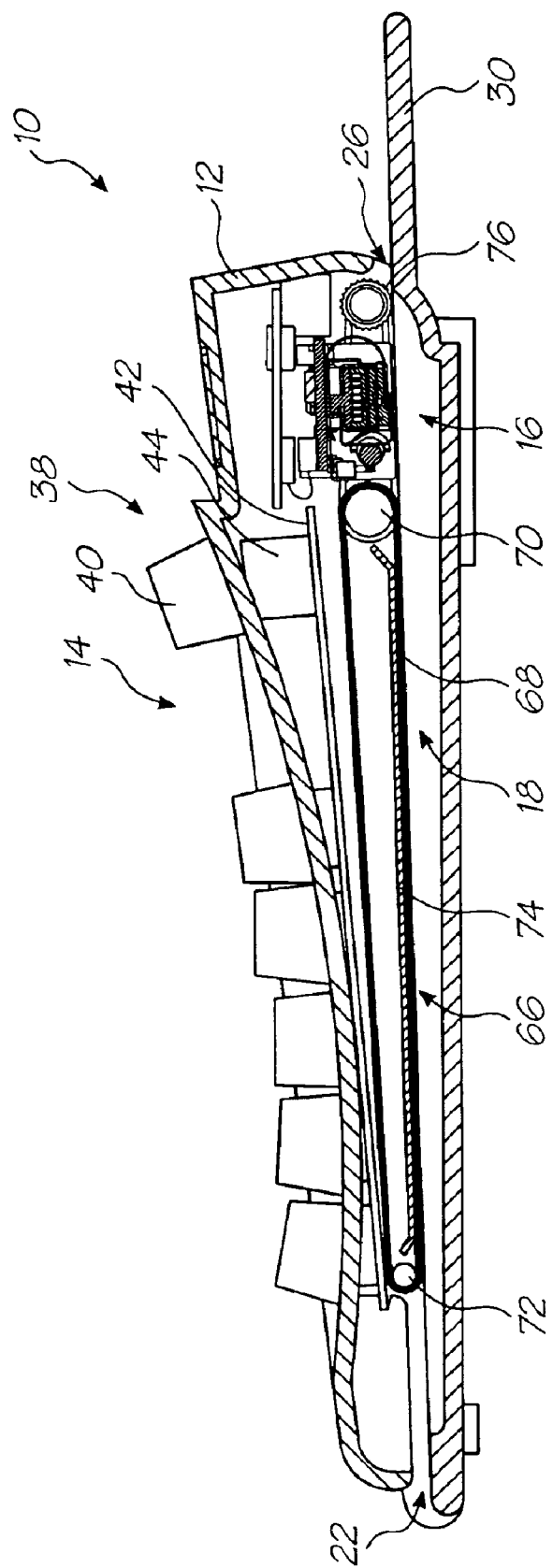
FIG. 2 shows a sectional side view of the keyboard.
Figure 3:
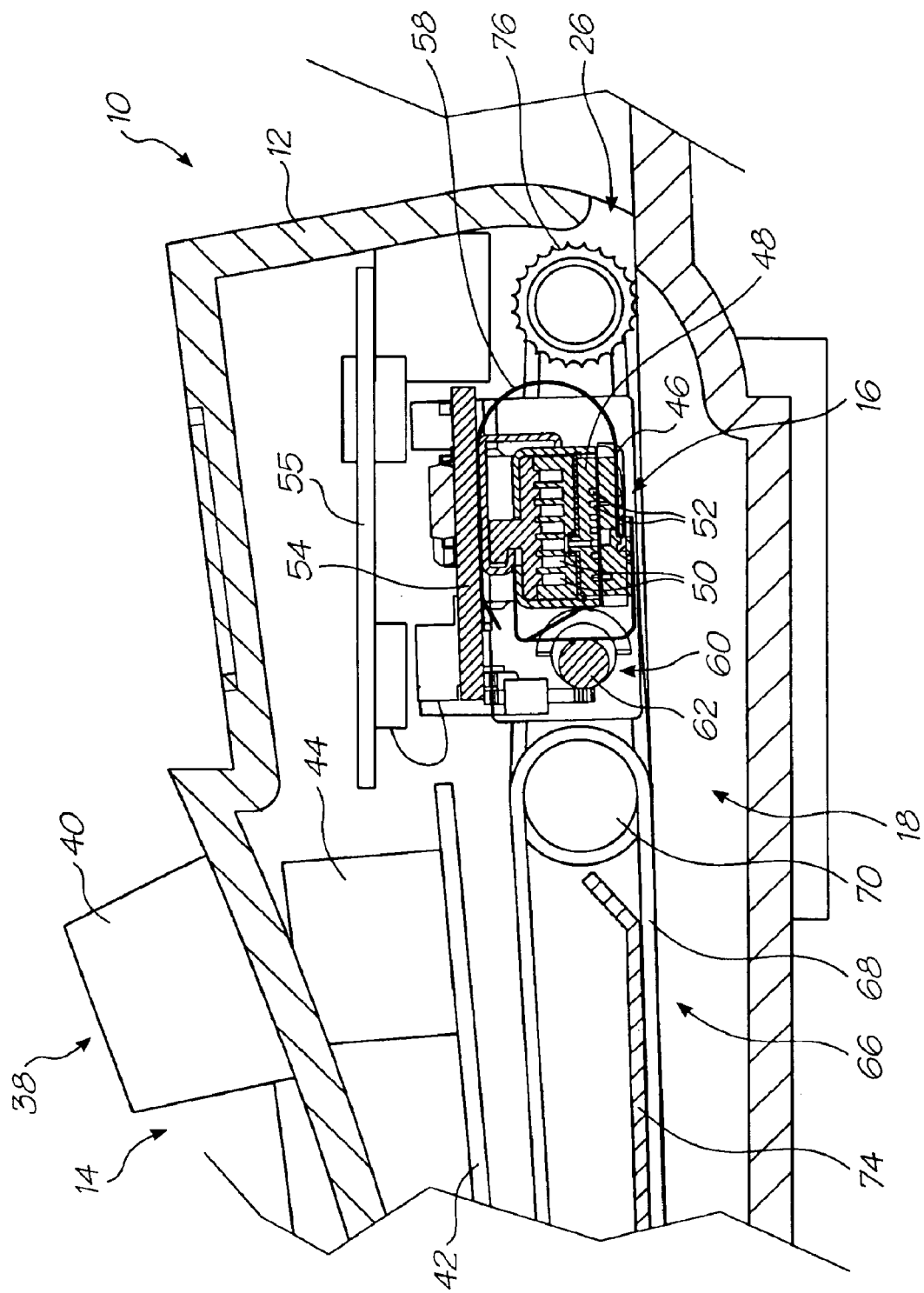
FIG. 3 shows, on an enlarged scale, a sectional side view of part of the keyboard.

In the drawings, reference numeral 10 generally designates a keyboard in accordance with the invention. The keyboard 10 is intended particularly for use with a computer. The keyboard 10 comprises a housing 12 on which a keypad 14 is arranged. A printer 16 (FIGS. 2 and 3) is contained in a chamber 18 defined in the housing 12 of the keyboard 10.

The housing 12 is dimensioned similarly to a conventional computer keyboard and is substantially rectangular when viewed in plan having a pair of opposed, longer sides and a pair of opposed, shorter sides. An input slot 22 is defined in one of the longer sides of the housing 12 for feeding print media in the form of a sheet of paper 24 to the printer 16. Preferably, the input slot 22 is defined in that side of the housing 12 which, in use, is closer to a user of the keyboard 10.

An ejection slot 26 is defined in an opposed, longer side of the housing through which the sheet of print media, incorporating an image 28, is ejected after completion of printing. An exit tray 30 extends outwardly from the ejection slot 26 on to which the sheet of paper 24 is fed after printing.

The keypad 14 includes an array if keys 38 arranged in a QWERTY keypad 32, a numerals keypad 34 and a plurality of control keys 36. Each key 38 of the keypad 14 includes a key cap 40 which communicates with a keyboard circuit board 42 (FIGS. 2 and 3) through an opening in a top surface of the housing 12. The key caps 40 engage key switches 44 mounted on the circuit board 42.

The printer 16 comprises a page width ink jet printhead 46 mounted in a support 48. The printhead 46 is a multi-color printhead for printing photo quality images 28. Accordingly, the support 48 includes a plurality of galleries 50, each of which contains a different color ink to be fed via passages 52 to the printhead 46.

Figure 1:
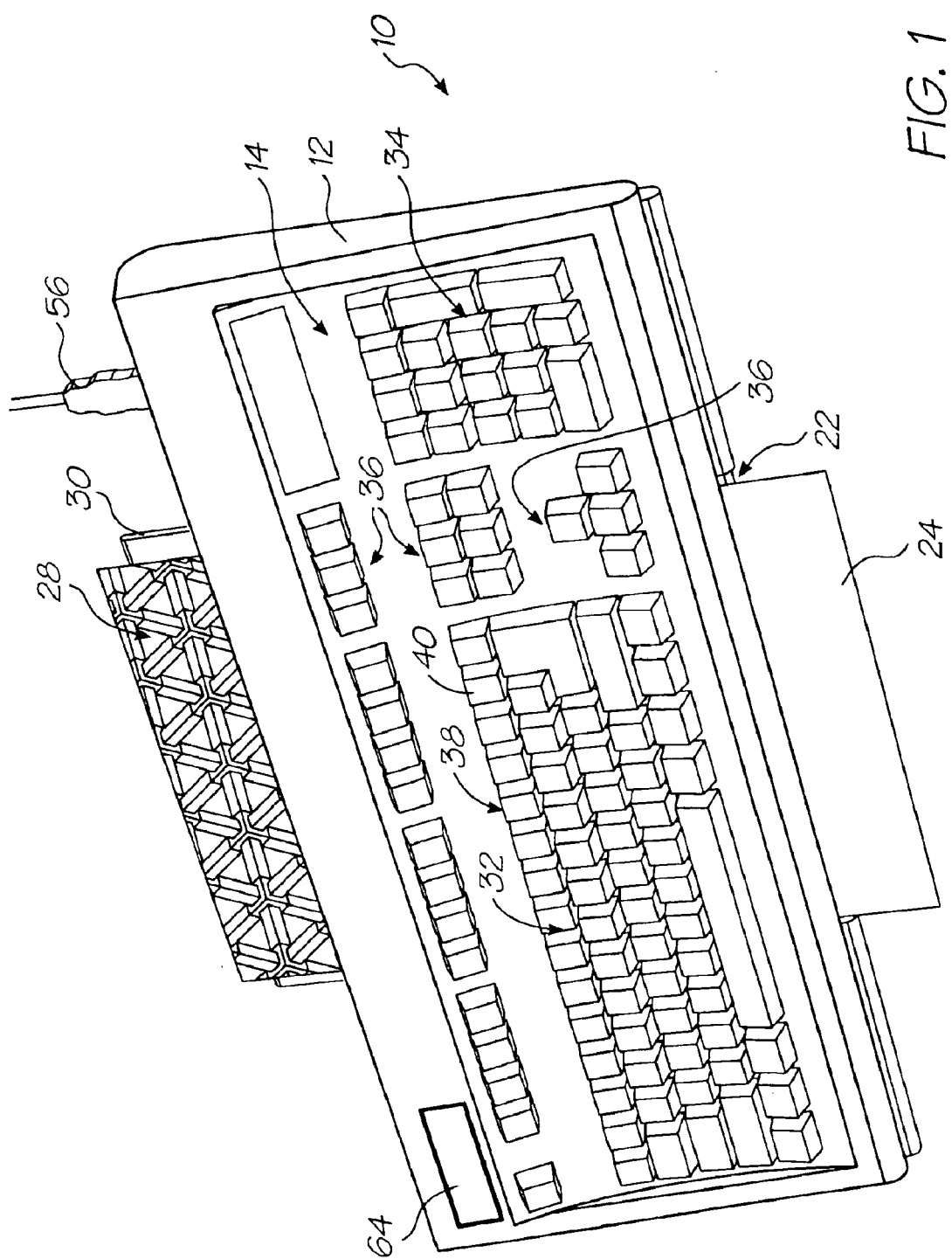
FIG. 1 shows a three dimensional view of a keyboard, in accordance with the invention.

The printer 16 includes a controller printed circuit board (PCB) 55. The PCB 55 receives printing commands from the computer (not shown) via a USB connector 56 (FIG. 1). A printhead PCB 54 communicates with the printhead 46 via a TAB automated bond film 58 or any other suitable, flexible film. The controller PCB 55 connects to the printhead PCB 54 via a flexible film.

A retaining device, in the form of a locking member 60, releasably locks the printer 16 in position in the chamber 18 of the housing 12. The locking device 60 includes a cam-like locking member 62.

Further, the printer 16 includes an ink supply cartridge (not shown) for feeding ink to the galleries 50 of the printhead support 48. The ink supply cartridge is accessed through an opening, closed off by a lid 64 (FIG. 1), in a top surface of the housing 12 to replace the cartridge when its supply of ink has been depleted.

The keyboard 10 includes a feed mechanism 66 for feeding the sheet of paper 24 to the printer 16. The feed mechanism 66 comprises an endless belt 68 which is rotated by a drive roller 70 and extends about an opposed, idler roller 72. A planar member in the form of a sprung metal plate 74 bears against the belt 68 to maintain the planarity of the belt 68 and, accordingly, the sheet of paper 24.

An engaging means, in the form of at least one spiked wheel 76, is arranged intermediate the printer 16 and the ejection slot 26. The, or each, spiked wheel 76 engages the sheet of paper 24, after printing of the image 28, and feeds the sheet of paper 24 through the ejection slot 26 to be accessed by the user.

In use, when an image 28 is to be printed, the user inserts a sheet of paper into the keyboard through the input slot 22 where it is fed to the printer 16 by the feed arrangement 66. By means of an appropriate command via the computer, the information or image to be printed is fed to the printer 16 via the USB connector 56 and the controller PCB 55. The printer 16 is controlled by the PCB 55 to print the image 28 on the sheet of paper 24 and to cause ejection of the sheet of paper 24 together with its printed image 28 thereon through the ejection slot 26.

It is an advantage of the invention that a computer peripheral is provided which enables a person rapidly to obtain copies of images while seated before the person's computer. In this regard, it is to be noted that the printer 16 is a high speed printer which can print at rates of up to 30 pages per minute. Hence, the need for using a communal work station is obviated. In addition, the incorporation of the printer within the keyboard 10 considerably reduces the space required for a computer together with its peripherals and, in so doing, providing more space to a user. It will be appreciated that this can be of major benefit where the work station is a confined working space.

What is claimed is:

1. A combination keyboard and printer apparatus adapted to connect to a computer system for providing user input commands to the computer, the apparatus including;

a housing having an upper surface formed with an opening for a number of keyboard keys;

a printer assembly located on a print media transport path within a chamber defined by the housing;

a print media entry slot continuous with said transport path formed through a first side of the housing;

a print media ejection slot continuous with said transport path formed through a second side of the housing opposite the first side; and a print media exit tray extending outwardly from the ejection slot formed as a unitary piece with the housing;

a serial bus to communicate with a computer, the user input commands being communicated to the computer through the serial bus;

a printer controller circuit that is coupled to the serial bus to communicate with the computer;

wherein the apparatus is adapted to receive print commands from the computer through the serial bus, the printer printing in response to the received print commands.

2. An apparatus according to claim 1, wherein the keyboard keys are arranged to engage key switches of a keyboard circuit board located within the housing.

3. An apparatus according to claim 2 including a belt-and-roller transport assembly disposed to transport print media along the transport path.

4. An apparatus according to claim 3, further including a planar member biased against the belt-and-roller transport assembly to maintain planarity of print media in use.

5. An apparatus according to claim 4, wherein the planar member and the belt-and-roller transport assembly are located beneath the keyboard circuit board.

6. An apparatus according to claim 1, wherein the printer assembly comprises a pagewidth ink jet printhead.

7. An apparatus according to claim 6, wherein the printer assembly includes a plurality of galleries each in fluid communication with the printhead and dedicated to store a different color ink.

* * * * *